(12) United States Patent
Ohira

(10) Patent No.: US 7,674,023 B2
(45) Date of Patent: Mar. 9, 2010

(54) HEADLIGHT ASSEMBLY FOR A STRADDLE-TYPE VEHICLE

(75) Inventor: Masaru Ohira, Shizuoka-ken (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 24 days.

(21) Appl. No.: 11/316,689

(22) Filed: Dec. 22, 2005

(65) Prior Publication Data

US 2006/0193143 A1 Aug. 31, 2006

(30) Foreign Application Priority Data

Dec. 27, 2004 (JP) ............... 2004-376525

(51) Int. Cl.
*F21V 33/00* (2006.01)
(52) U.S. Cl. ............... 362/475; 362/460; 362/465; 362/473; 362/476; 296/77.1; 296/78.1; 180/218; 180/219
(58) Field of Classification Search ........... 362/460, 362/465, 475, 476, 473; 296/77.1, 78.1; 180/218, 219; 293/105
See application file for complete search history.

(56) References Cited

U.S. PATENT DOCUMENTS

| | | | |
|---|---|---|---|
| 2,504,265 A | | 4/1950 | Jozif |
| 2,754,452 A | * | 7/1956 | Onksen ............ 315/83 |
| 2,792,899 A | * | 5/1957 | Piatti ............ 180/229 |
| 3,788,532 A | | 1/1974 | Bish |
| 4,372,602 A | * | 2/1983 | Tsuchiya et al. ........ 296/77.1 |
| 5,955,945 A | * | 9/1999 | Fuhrer ............ 340/479 |
| 6,031,452 A | | 2/2000 | Trbovich |
| 6,332,639 B1 | | 12/2001 | Tanaka et al. |
| 6,428,076 B2 | | 8/2002 | Sumada et al. |
| 6,538,567 B2 | | 3/2003 | Stewart |

(Continued)

FOREIGN PATENT DOCUMENTS

EP 0 459 286 A1 12/1991

(Continued)

OTHER PUBLICATIONS

U.S. Appl. No. 11/280,947 (Pub. No. 2007-0216524), including file history.

(Continued)

*Primary Examiner*—Sandra L O'Shea
*Assistant Examiner*—Mary Zettl
(74) *Attorney, Agent, or Firm*—Keating & Bennett, LLP

(57) ABSTRACT

A headlight assembly for a straddle-type vehicle (e.g., a motor scooter) is provided that is positioned lower to the ground and farther forward than typical headlights to provide enhanced illumination from a front end of the vehicle. The assembly comprises a front portion of a vehicle body cover that extends over a portion of the front wheel of the vehicle. A headlight assembly is disposed at least partially on a front end of the front portion of the vehicle body cover. The headlight assembly comprises an upper light for generating a low beam of light and a lower light for generating a high beam of light. In addition, the headlight comprises position lights disposed on the right side and the left side of the upper and lower lights. Preferably, at least a portion of the headlight assembly is positioned farther forward than a leading end of the front wheel of the vehicle.

36 Claims, 5 Drawing Sheets

U.S. PATENT DOCUMENTS

| | | |
|---|---|---|
| 6,615,945 B2 | 9/2003 | Minami et al. |
| 6,626,260 B2 | 9/2003 | Gagnon et al. |
| 6,732,830 B2 | 5/2004 | Gagnon et al. |
| 6,776,250 B2 | 8/2004 | Kuji et al. |
| 6,892,842 B2 | 5/2005 | Bouffard et al. |
| 7,066,293 B2 | 6/2006 | Kakizoe |
| 7,125,134 B1 * | 10/2006 | Hedlund et al. ............. 362/106 |
| 7,374,192 B2 | 5/2008 | Mimasa |
| 7,431,114 B2 | 10/2008 | Ohira et al. |
| 2001/0013708 A1 | 8/2001 | Tanaka et al. |
| 2001/0015190 A1 | 8/2001 | Kawamoto |
| 2002/0044052 A1 | 4/2002 | Stewart |
| 2004/0145898 A1 * | 7/2004 | Ase et al. .................... 362/476 |
| 2005/0064785 A1 | 3/2005 | Lee |
| 2005/0117359 A1 * | 6/2005 | Takahashi et al. ........... 362/473 |

FOREIGN PATENT DOCUMENTS

| | | |
|---|---|---|
| GB | 2 141 392 A | 12/1984 |
| JP | 59143721 A | 8/1984 |
| JP | 61012448 A | 1/1986 |
| JP | 61-175189 | 8/1986 |
| JP | 02136383 A * | 5/1990 |
| JP | 09150765 A * | 6/1997 |
| JP | 2002-234477 | 8/2003 |

OTHER PUBLICATIONS

U.S. Appl. No. 11/316,356 (Pub. No. 2006-0139939), including file history.

* cited by examiner

HEADLIGHT ASSEMBLY FOR A STRADDLE-TYPE VEHICLE

CROSS-REFERENCE TO RELATED APPLICATIONS

This application is based on and claims priority under 35 U.S.C. § 119(a)-(d) to Japanese Patent Application No. 2004-376525, filed Dec. 27, 2004, the entire content of which is hereby incorporated by reference.

BACKGROUND OF THE INVENTION

1. Field of the Invention

The present invention relates in general to straddle-type vehicles and, in particular, to a straddle-type vehicle (e.g., a motor scooter) having a headlight assembly for providing enhanced illumination from a fore end of the vehicle.

2. Description of the Related Art

Motor scooters typically have a front portion of a vehicle body cover positioned at least partially above a front wheel of the vehicle. In addition, motor scooters have a headlight disposed on a front portion of the vehicle. However, on many motor scooters, the headlight is either disposed above a top portion of the front wheel or slightly behind the front wheel. The headlight is also typically close to the head pipe of the vehicle body and extends from an upper portion of the vehicle body cover. Consequently, the height of the front portion of the vehicle body cover, including the headlight, is likely to be relatively high because of the placement of the headlight above the front wheel and near the head pipe. As a result, the headlight is significantly high relative to the ground.

Placement of the headlight on an upper portion of the front portion of the vehicle body cover has other disadvantageous effects. First, the headlight often protrudes from the vehicle body cover when disposed on an upper portion thereof. As a result, the aerodynamic configuration of the motor scooter is negatively affected because the protruding headlight generates significant wind resistance during operating conditions. Second, the headlight occupies space on the upper portion of the vehicle body front portion cover. Such space could be used for other components of the motor scooter if an alternative location for the headlight were provided. Third, the placement of the headlight above the front wheel and/or behind the front wheel is aesthetically unappealing to some users and observers of motor scooters. This problem is particularly important because the front portion of the vehicle body cover and the headlight are both prominent features of the vehicle and are often the first components of the motor scooter seen by observers.

SUMMARY OF THE INVENTION

A vehicle with a front portion cover and headlight closer to the ground and farther forward relative to the vehicle is desirable since, among other things, such a configuration will provide better illumination of the road or highway while the straddle-type vehicle is being operated. Therefore, an aspect of this invention involves a straddle-type vehicle in which a front portion of the vehicle body cover, which has a headlight, is positioned lower to the ground and farther forward so as to enhance illumination from a front end of the vehicle at least when operating.

Another aspect of the present invention involves a straddle-type vehicle comprising a front wheel that rotates about a generally horizontal axis and a vehicle body that is supported at least in part by the front wheel. The vehicle body includes a head pipe to which the front wheel is coupled by a front fork assembly. A light, having a lens, is supported on the vehicle body. At least the lens of the light is disposed in front of a line that extends parallel to the head pipe and passes through a point at the top of the front wheel at least when the vehicle is upright and supported by the front wheel.

An additional aspect of the present invention involves a straddle-type vehicle comprising at least a front wheel and a rear wheel. A body is supported by the at least front and rear wheels, with the front wheel rotating about a first axis and the rear wheel rotating about a second axis. A headlight, having a lens, is supported by the body. At least the lens of the headlight is positioned forward of a vertical line that extends through the rotational axis of the front wheel.

BRIEF DESCRIPTION OF THE DRAWINGS

These and other features, aspects, and advantages of the present invention will now be described in connection with preferred embodiments of the invention, in reference to the accompanying drawings. The illustrated embodiments, however, are merely examples and are not intended to limit the invention. The drawings include the following five figures.

DETAILED DESCRIPTION OF THE PREFERRED EMBODIMENT

Figure 1:
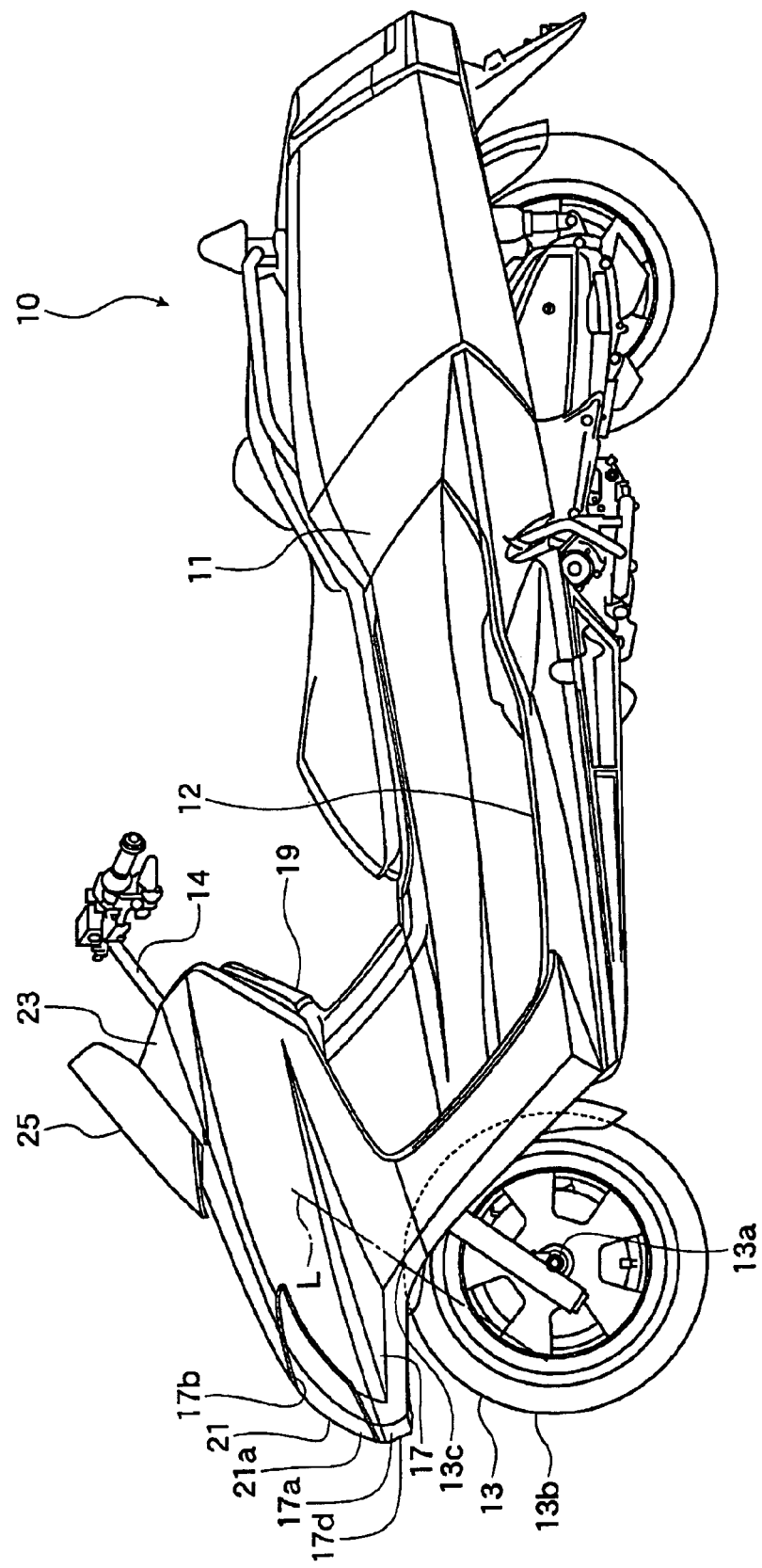
FIG. 1 is a side elevational view of a straddle-type vehicle including a headlight assembly configured in accordance with a preferred embodiment of the present invention. The straddle-type vehicle is shown in a condition where no riders are seated on the vehicle, the front and rear wheels are both on the ground, and the vehicle is not leaning on a side or main stand.

A headlight assembly is illustrated in the drawings and is described below in the context of an application with a straddle-type vehicle. However, the headlight assembly can be used with other types of vehicles. Preferably, the assembly can be used with vehicles which have a wheel that rotates about a generally horizontal axis, a steering column, a steering mechanism coupled to the top of the steering column, and a straddle-type seat located substantially near the steering column. For example, such vehicles in which the assembly described herein can be employed include, but are not limited to, a motorcycle, a scooter, and a multi-terrain vehicle. Accordingly, the below description and the drawings describe a motorized scooter; however, the present headlight assembly can be used on other types of straddle-type vehicles as well.

Figure 2:
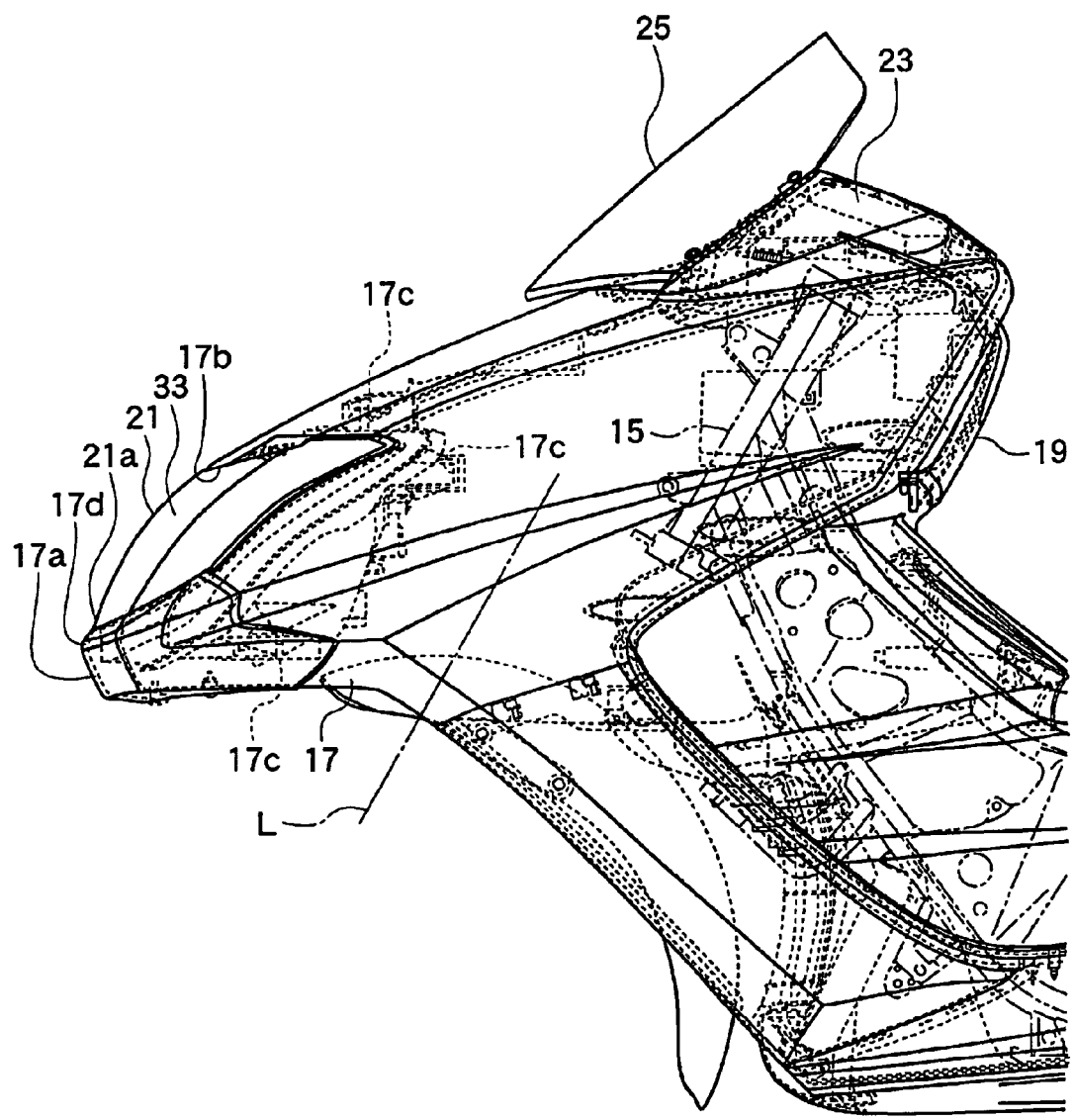
FIG. 2 is an enlarged side view of a front portion of a vehicle body cover of the straddle-type vehicle shown in FIG. 1.

The configuration of a motor scooter in an embodiment of the invention is described below in reference to the drawings. With reference to FIGS. 1 and 2, the reference numeral 10 indicates a straddle-type vehicle (e.g., a motor scooter). A vehicle body cover 11 substantially covers a vehicle body of the straddle-type vehicle 10 as shown in FIG. 1. A front portion 17 of the vehicle body cover 11 is disposed above a front wheel 13 to cover a front side of a head pipe 15, as shown in FIG. 2, relative to the vehicle. The front wheel 13, which preferably includes both a wheel rim and a tire, is capable of rotating about a generally horizontal axis. A front end 17a of the vehicle body front portion cover 17 is positioned above a front end 13b of the front wheel 13. The head pipe 15 supports a steering shaft 14 for steering the front wheel 13. This head pipe 15 extends generally vertically in a rear portion of the vehicle body front portion cover 17.

In one embodiment, a vehicle body front portion rear surface cover 19, disposed in the rear of the head pipe 15 relative to the vehicle, covers a rear surface side of the front portion 17 of the vehicle body cover 11 and a pair of foot rests 12 each having a lower surface extending in the rear surface side. In one mode, each foot rest 12 extends upward toward the rear of the straddle-type vehicle 10. As illustrated in FIG. 1, the direction in which the foot rests 12 extend is generally parallel to the direction in which the top surface of the front portion cover 17 extends.

The front end 17a of the vehicle body front portion cover 17 has a headlight 21 disposed at a location of the vehicle body front portion cover 17 which is further forward than an axle 13a of the front wheel 13. A front end 21a of the headlight 21 and the front end 17a of the vehicle body front portion cover 17 are positioned at substantially the same location in a fore to aft direction of the vehicle. In this embodiment of the present headlight assembly, the body of the headlight 21 is preferably disposed in front of a line L, as shown in FIG. 1, which passes a top 13c of the front wheel 13, at least in a condition where the front and rear wheels are both on the ground, the vehicle is not leaning on a side or main stand, and no riders or passengers are seated on the vehicle. Line L also preferably extends along an inclination of the head pipe 15. In one mode, the headlight 21 comprises a light-emitting diode (LED) light source. As also seen in FIG. 1, the front end 21a of the headlight 21 extends farther forward on the vehicle than does the front end 13b of the front wheel 13.

In another embodiment, flasher lamps 23 are disposed on the right and left sides of a rear portion of the vehicle body front portion cover 17. The vehicle body front portion cover 17 has a windshield 25 at a center of its rear portion between the right and left flasher lamps 23.

According to the straddle-type vehicle 10 having the structure described above, the vehicle body front portion cover 17 is disposed above the front end 13b of the front wheel 13, and the headlight 21 is located at the front end 17a of the vehicle body front portion cover 17. Therefore, the headlight 21 can be placed further forward than the top 13c of the front wheel 13. In addition, the headlight 21 can be lowered to a location below the vehicle body front portion cover 17 without interfering with the front wheel 13. Advantageously, the height of the vehicle body front portion cover 17 from the ground is relatively low and, therefore, the degree of freedom for designing the vehicle body front portion cover 17 can be improved.

In addition, because the headlight 21 is disposed at the front end 17a of the vehicle body front portion cover 17 positioned above the front wheel 13, there is a broad space between the head pipe 15 and the headlight 21. Thus, large components such as, for example, a battery or the like can be placed in the interior of the vehicle body front portion cover 17 between the head pipe 15 and the headlight 21.

Further, because the headlight 21 is disposed at the front end 17a of the vehicle body front portion cover 17 positioned above the front wheel 13, the headlight 21 is located further forward relative to the front wheel 13 of the straddle-type vehicle 10 than conventional headlight assemblies. As a result, the front portion of the vehicle can be illuminated and easily recognized by others. In addition, such a configuration will provide better illumination of the road or highway while the straddle-type vehicle is being operated.

With reference to FIG. 2, the headlight 21 discussed above is attached in such a manner that the light permeable cover 33 is disposed at a headlight installation opening 17b of the vehicle body front portion cover 17. The headlight installation opening 17b is formed at the front end 17a of the vehicle body front portion cover 17. In this embodiment, substantially the entire headlight installation opening 17b is formed at a location which is further forward than a location above the axle 13a of the front wheel 13 as shown in FIG. 1. The headlight 21 can attach to the headlight installation opening 17b of the vehicle body front portion cover 17 from a rear side of the vehicle. In addition, as shown in FIG. 3, the headlight 21 is attached in such a manner that a plurality of installation portions 37 provided at the circumference of the headlight 21 are fixed to a plurality of receiving portions 17c of the vehicle body front portion cover 17.

Figure 3:
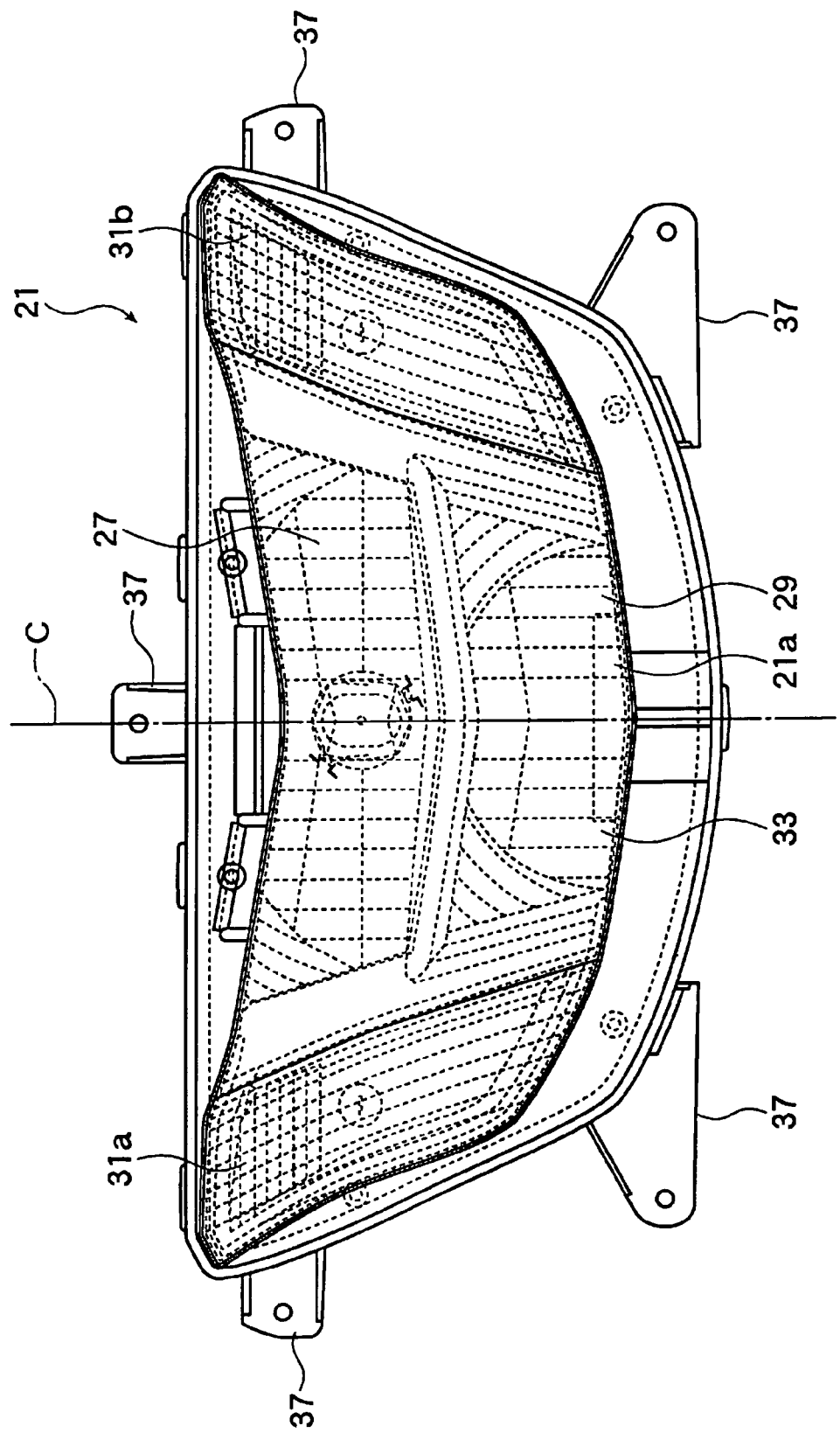
FIG. 3 is an enlarged front view of a headlight assembly of the straddle-type vehicle shown in FIG. 1.
Figure 4:
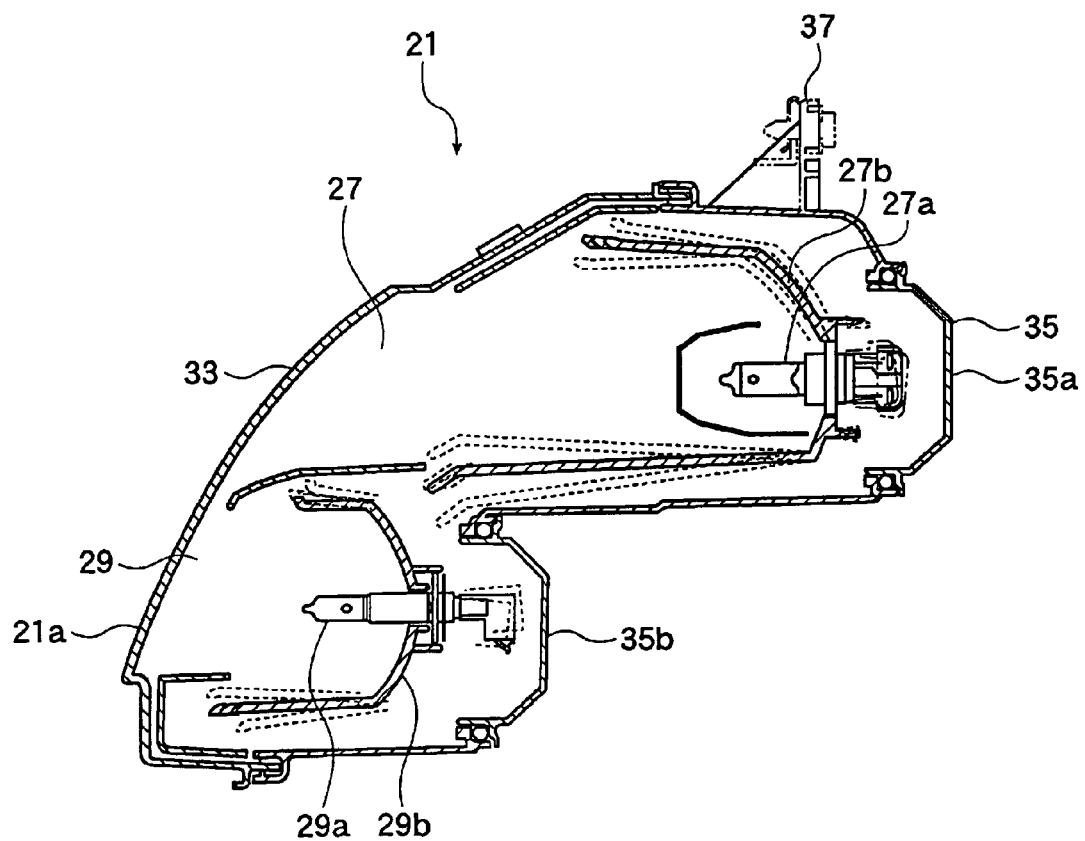
FIG. 4 is a cross-sectional view of the headlight assembly taken along line 4-4 of FIG. 3.

Further, as shown in FIG. 3, the headlight 21 comprises a low beam light 27, which is a first light comprising an upper light, positioned at an upper row on a center axis C extending in the center of a horizontal direction of the vehicle (i.e., along a longitudinal center plane of the vehicle). The headlight 21 also comprises a high beam light 29, which is a second light comprising a lower light, positioned at a lower row disposed at least partially below the upper row. As a result, low beam light 27 and the high beam light 29 are disposed in a top and bottom double row relationship. In addition, as shown in FIG. 4, the low beam light 27 and the high beam light 29 have a low beam bulb 27a and a high beam bulb 29a, respectively, and each light 27, 29 has a reflection mirror 27b, 29b. In this embodiment, the high beam bulb 29a is positioned further forward than the low beam bulb 27a relative to the vehicle. In addition, although a detailed illustration is omitted, the vehicle body front portion cover 17 is preferably fixed to the head pipe 15 through installation stays or the like.

As shown in FIG. 3, a pair of position lights 31a, 31b, which comprise a right and a left pair of side lights, are disposed on both the right and left sides of the low beam light 27 and the high beam light 29. Each position light 31a, 31b extends vertically and continuously along respective side edges of the low beam light 27 and the high beam light 29. In one embodiment, each position light 31a, 31b has a vertical length which is equal to the total length of a vertical length of the low beam light 27 and a vertical length of the high beam light 29.

In another embodiment of the present straddle-type vehicle 10, the headlight 21 comprises the high beam light 29 and the low beam light 27 both positioned on the center axis C located in the center of the horizontal direction and in a top and bottom double row relationship with each other. Thus, the high beam light 29 which is placed in the lower row can be positioned further forward than the low beam light 27 which is placed in the upper row. Consequently, the height of the body of the headlight 21 and the vehicle body front portion cover 17 from the ground can be maintained as low as possible. Additionally, visibility of the beam from a front portion of the vehicle 10 can be improved.

In another embodiment, the pair of position lights 31a, 31b, each of which is taller than it is wide, is disposed on both the right and left sides of the high beam light 29 and the low beam light 27, and each position light 31a, 31b has a length that ranges between the top and bottom ends of both the beam lights 29, 27. Thus, both of the position lights 31a, 31b do not project in the vertical direction. In addition, the position lights 31a, 31b are easily seen and recognized from locations near the front side and both the lateral sides of the vehicle.

Figure 5:
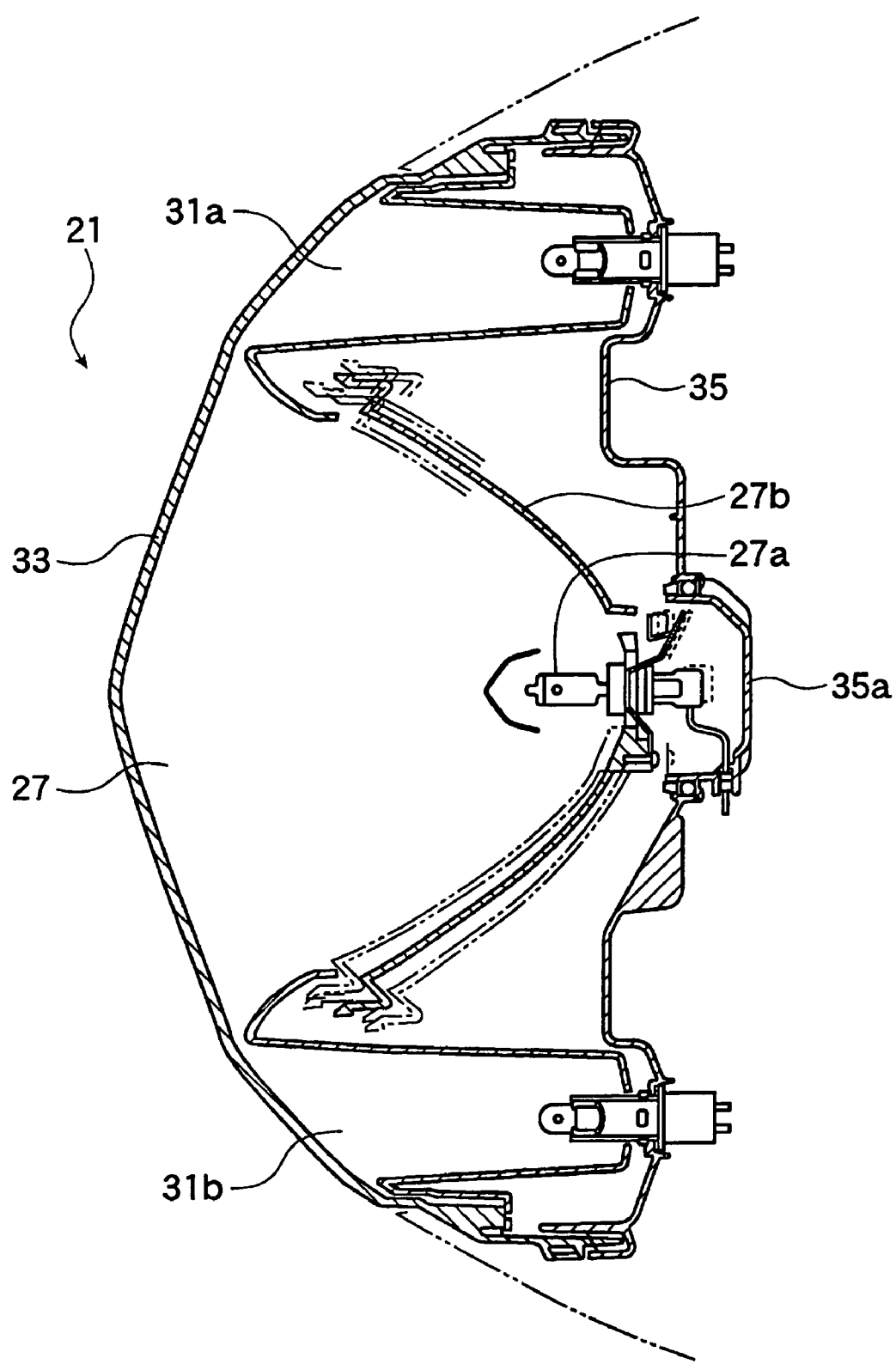
FIG. 5 is a cross-sectional view of the headlight assembly taken along line 5-5 of FIG. 3.

As shown in FIGS. 4 and 5, a light permeable cover 33 is attached to a front portion of the headlight 21 relative to the vehicle. This light permeable cover 33 has a curved configuration so that a portion thereof facing front surfaces of the low beam light 27 and the high beam light 29 projects further forward than another portion of the light permeable cover 33 facing front surfaces of the position lights 31a, 31b as shown in FIG. 5.

In addition, a back cover 35 is attached to a rear portion of the headlight 21 relative to the vehicle to cover the back of the headlight 21. The back cover 35 has a configuration including a lower portion 35b covering the back of the high beam light 29 and an upper portion 35a covering the back of the low beam light. Preferably, the lower portion 35b is located further forward than the upper portion 35a of the back cover 35.

Further, in the headlight 21 positioned further forward than the axle 13a of the front wheel 13, the high beam bulb 29a of the high beam light 29 is positioned further forward than the low beam bulb 27a of the low beam light. In addition, the lower portion 35b of the back cover 35 is positioned further forward than the upper portion 35a thereof. The headlight 21 thus can extend generally along the outer circumferential shape of the front wheel 13, and can be prevented from interfering with the front wheel 13. Advantageously, the headlight 21 can be further lowered to a much lower location of the vehicle body front portion cover 17 than would otherwise be possible.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of skill in the art based upon this disclosure. It is also contemplated that various combinations or sub-combinations of the specific features and aspects of the embodiments may be made and still fall within the scope of the invention. Accordingly, it should be understood that various features and aspects of the disclosed embodiments can be combined with or substituted for one another in order to form varying modes of the disclosed invention. Thus, it is intended that the scope of the present invention herein disclosed should not be limited by the particular disclosed embodiments described above, but should be determined only by a fair reading of the claims.

What is claimed is:

1. A straddle-type vehicle comprising:
   a front wheel that rotates about a generally horizontal axis;
   a vehicle body supported at least in part by the front wheel, wherein the vehicle body includes a steering shaft for steering the front wheel;
   a vehicle body cover extending over at least a portion of the vehicle body, the vehicle body cover including a front portion that extends over at least a portion of the front wheel; and
   a headlight disposed at least partially within the front portion of the vehicle body cover, the headlight being positioned at a front end of the vehicle body cover and on a center axis extending in the center of a horizontal direction of the vehicle, wherein the headlight projects beyond the front wheel in a forward direction;
   wherein the vehicle body does not include any portions extending in front of the front wheel and below the horizontal axis supporting a bumper protruding more forward than the headlight and wherein the front portion of the vehicle body cover extends laterally outside the front wheel to overlap the front wheel above the horizontal axis of the front wheel when viewed in a transverse direction of the vehicle, and at least a portion of a lower edge of the front portion of the vehicle body cover lies above the horizontal axis of the front wheel when viewed in the transverse direction of the vehicle.

2. The straddle-type vehicle of claim 1 further comprising a head pipe for supporting the steering shaft, wherein the head pipe extends in a rear portion of the front portion of the vehicle body cover, and wherein at least part of the headlight is disposed in front of a line that extends parallel to the head pipe and passes through a point at the top of the front wheel at least when the vehicle is upright and supported by the front wheel.

3. The straddle-type vehicle of claim 1, wherein the headlight comprises a first light and a second light, and each light is disposed generally to lie symmetrically about a longitudinal center plane of the vehicle, which extends perpendicular to the horizontal axis.

4. The straddle-type vehicle of claim 3, wherein the first light comprises an upper light and the second light comprises a lower light such that the upper light is disposed at least partially above the lower light in a direction generally orthogonal to the horizontal axis.

5. The straddle-type vehicle of claim 4, wherein the upper light generates a lower intensity beam of light and the lower light generates a higher intensity beam of light.

6. The straddle-type vehicle of claim 4, wherein the headlight further comprises a first side light and a second side light.

7. The straddle-type vehicle of claim 6, wherein the first side light is disposed on a first side of the longitudinal center plane and the second side light is disposed on a second side of the longitudinal center plane.

8. The straddle-type vehicle of claim 4 further comprising an upper light bulb disposed in the upper light and a lower light bulb disposed in the lower light, wherein the lower light bulb is positioned further forward than the upper light bulb.

9. The straddle-type vehicle of claim 1 additionally comprising a foot rest disposed on the vehicle to an aft side of the front wheel, at least a portion of the foot rest extending rearward and upwardly such that said portion of the foot rest extends in a direction generally parallel to an upper surface of the front portion of the vehicle body cover.

10. The straddle-type vehicle of claim 1, wherein in the headlight comprises a light-emitting diode (LED).

11. The straddle-type vehicle of claim 1, wherein the front wheel is disposed along a plane passing longitudinally through a central portion of the vehicle.

12. The straddle-type vehicle of claim 1, wherein the headlight is disposed in a central portion of the front portion of the vehicle body cover.

13. The straddle-type vehicle of claim 1, wherein the headlight comprises a headlight cover, the front portion of the vehicle body cover defining an installation opening for attaching the headlight cover to the vehicle body cover such that the installation opening is positioned forward of a vertical line that extends through a rotational axis of the front wheel.

14. The straddle-type vehicle of claim 1, wherein the straddle-type vehicle comprises a two-wheeled vehicle.

15. The straddle-type vehicle of claim 1, wherein the straddle-type vehicle comprises a motorized scooter.

16. The straddle-type vehicle of claim 1, wherein the straddle-type vehicle has a single headlight unit positioned at the front end of the vehicle body cover and on the center axis extending in the center of the horizontal direction of the vehicle.

17. The straddle-type vehicle of claim 1, wherein the vehicle body comprises a frame, and wherein a lower portion of the front portion of the vehicle body cover is fixed to the frame of the vehicle body.

18. The straddle-type vehicle of claim 1, wherein the front portion of the vehicle body cover overlaps the front wheel only above the horizontal axis of the front wheel.

19. The straddle-type vehicle of claim 1, wherein the front portion of the vehicle body cover overlaps the front wheel in an area located only rearward of a top of the front wheel and only above the horizontal axis of the front wheel.

20. The straddle-type vehicle of claim 1, wherein a bottom portion of the front the vehicle body cover located forward more than the horizontal axis generally extends horizontally and forward from the vicinity of the top of the front wheel.

21. A straddle-type vehicle comprising:
a front wheel that rotates about a generally horizontal axis;
a vehicle body supported at least in part by the front wheel, the vehicle body including a head pipe to which the front wheel is coupled by a front fork assembly;
a vehicle body cover that extends over at least a portion of the front wheel; and
a light being supported on the vehicle body and having a lens, at least a portion of the light being disposed within the vehicle body cover, the lens being disposed in front of a line that extends parallel to the head pipe and passes through a point at the top of the front wheel at least when the vehicle is upright and supported by the front wheel, the light being positioned on a center axis extending along a generally vertical longitudinal center plane of the vehicle, wherein at least a portion of the light lies farther forward on the vehicle than does a front edge of the wheel;
wherein the vehicle body cover does not extend in front of and below the horizontal axis to support a bumper which projects more forwardly than the headlight, the vehicle body cover extends laterally outside the front wheel to overlap the front wheel above the horizontal axis of the front wheel when viewed in a transverse direction of the vehicle, and at least a portion of a lower edge of the vehicle body cover lies above the horizontal axis of the front wheel when viewed in the transverse direction of the vehicle.

22. The straddle-type vehicle of claim 21, wherein the light comprises a headlight.

23. The straddle-type vehicle of claim 22, wherein in the headlight comprises a light-emitting diode (LED).

24. The straddle-type vehicle of claim 21, wherein a lower central portion of the light lies farther forward on the vehicle than does a front edge of the wheel.

25. The straddle-type vehicle of claim 21, wherein the vehicle body comprises a frame, and wherein a lower portion of the front portion of the vehicle body cover is fixed to the frame of the vehicle body.

26. The straddle-type vehicle of claim 21, wherein the front portion of the vehicle body cover overlaps the front wheel only above the horizontal axis of the front wheel.

27. The straddle-type vehicle of claim 21, wherein the front portion of the vehicle body cover overlaps the front wheel in an area located only rearward of a top of the front wheel and only above the horizontal axis of the front wheel.

28. The straddle-type vehicle of claim 21, wherein a bottom portion of the front the vehicle body cover located forward more than the horizontal axis generally extends horizontally and forward from the vicinity of the top of the front wheel.

29. A straddle-type vehicle comprising at least a front wheel and a rear wheel, a body supported by the at least front and rear wheels, the front wheel rotating about a front axis, and the rear wheel rotating about a second axis, a headlight supported by the body and having a lens, and a vehicle body cover that extends over at least a portion of the front wheel and at least a portion of the headlight being disposed within the vehicle body cover, the headlight being disposed along a generally vertical plane passing longitudinally through a central portion of the vehicle, at least the lens of the headlight being positioned forward of a vertical line that extends through the front axis of the front wheel, wherein at least a portion of the headlight lies farther forward on the vehicle than does a leading surface of the front wheel, the leading surface disposed farther forward than substantially any other surface of the front wheel at least when the vehicle is stationary, wherein the vehicle body cover extends laterally outside the front wheel to overlap the front wheel above the front axis of the front wheel such that at least a portion of a lower edge of the vehicle body cover is disposed between an uppermost surface of the front wheel and the front axis of the front wheel when viewed in a transverse direction of the vehicle, and wherein the vehicle body does not extend around the front of the front wheel below the front axis to support a bumper disposed further forward than the front wheel and the headlight.

30. The straddle-type vehicle of claim 29, wherein the light comprises a light-emitting diode (LED).

31. The straddle-type vehicle of claim 29, wherein the front wheel is disposed along the generally vertical plane passing longitudinally through the central portion of the vehicle.

32. The straddle-type vehicle of claim 29, wherein at least the lens of the headlight is positioned forward of a vertical line that extends through a location disposed midway between a leading edge of the front wheel and the front axis of the front wheel.

33. The straddle-type vehicle of claim 29, wherein the body comprises a frame, and wherein a lower portion of the front portion of the vehicle body cover is fixed to the frame.

34. The straddle-type vehicle of claim 29, wherein the front portion of the vehicle body cover overlaps the front wheel only above the front axis.

35. The straddle-type vehicle of claim 29, wherein a portion of the lower edge of the vehicle body cover located forward more than the front axis generally extends horizontally and forward from the vicinity of the top of the front wheel.

36. The straddle-type vehicle of claim 34, wherein a portion of the lower edge of the vehicle body cover located forward more than the front axis generally extends horizontally and forward from the vicinity of the top of the front wheel.

* * * * *